Figure 1:
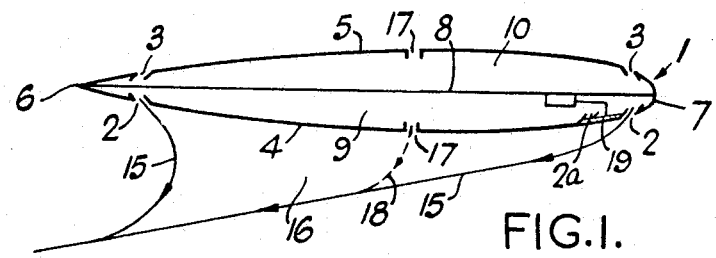

Sept. 27, 1966  C. S. COCKERELL  3,275,266

FOILS FOR MOVEMENT IN A FLUID

Filed March 6, 1964  2 Sheets-Sheet 1

INVENTOR
C. S. COCKERELL
BY
Cameron, Kerkam & Sutton
ATTORNEYS

Sept. 27, 1966  C. S. COCKERELL  3,275,266
FOILS FOR MOVEMENT IN A FLUID
Filed March 6, 1964  2 Sheets-Sheet 2
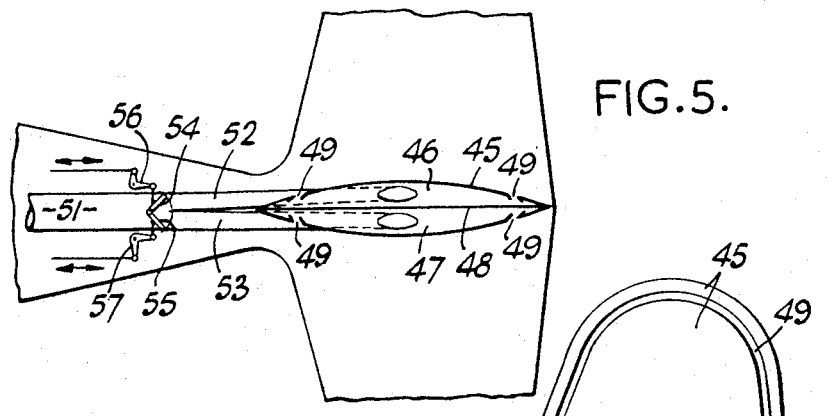
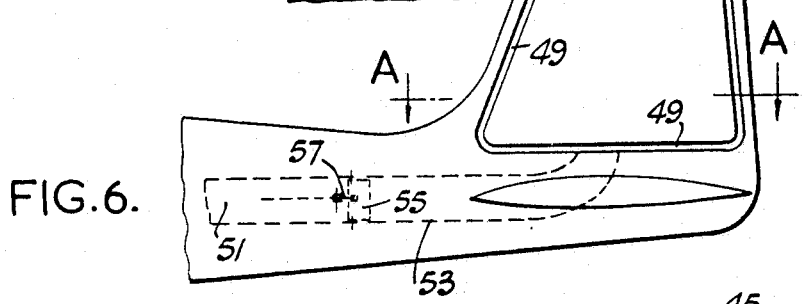
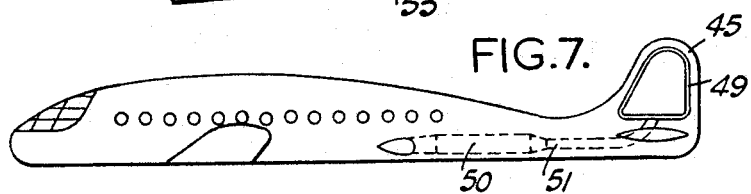
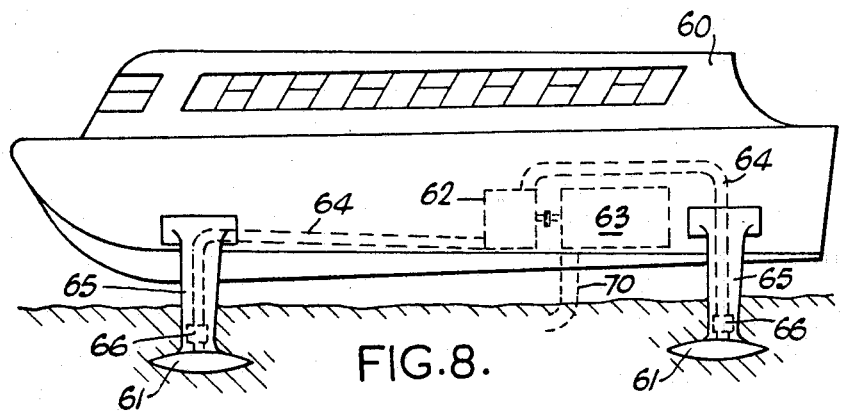
INVENTOR
C. S. COCKERELL
BY
Cameron, Kerkam & Sutton
ATTORNEYS

United States Patent Office 3,275,266
Patented Sept. 27, 1966

3,275,266
FOILS FOR MOVEMENT IN A FLUID
Christopher Sydney Cockerell, Bassett, Southampton, England, assignor to Hovercraft Development Limited, London, England, a British company
Filed Mar. 6, 1964, Ser. No. 349,834
Claims priority, application Great Britain, Oct. 20, 1959, 35,593/59
3 Claims. (Cl. 244—42)

In co-pending application Serial No. 63,296, filed October 18, 1960, now Patent No. 3,124,322, of which this application is a continuation-in-part, there are described aircraft having means for forming cushions of pressurised gas beneath the wings for assisting in take-off and landing and to produce aerodynamic lift when the aircraft is flying.

This invention relates to members in the form of foils moving in a fluid and to means for varying the forces produced on the foils by the movement through the fluid.

A foil mounted horizontally will produce a force, generally referred to as "lift," when the foil moves through a fluid. The lift will be positive or negative, that is upward or downward, depending upon, among other things, the angle of incidence of the foil, the thickness of the foil and its chord ratio. A vertical foil will produce a sideways force, either to one side or the other, and a foil which is inclined at an angle between horizontal and vertical will produce both lift and a sideways force, the ratio of one to the other depending upon the angle at which the foil is inclined.

The force produced by a foil may be varied by varying the angle of incidence. This can be done by moving the foil as a whole, or moving only a part of the foil, generally by pivoting the foil or part of the foil about an axis parallel to the span of the foil. In thin foils, the pivotal attachment often protrudes through one or both surfaces of the foil, particularly when one part is to pivot relative to another part. Where the whole foil is moved, the forces produced by the foil are concentrated at the pivot points requiring very strong and heavy constructions.

An object of the invention is to provide a foil the angle of incidence of which can be varied without moving the foil or any part of it.

According to the invention there is provided a foil having a trailing edge, at least two ports in one of the surfaces of the foil extending in a direction substantially parallel to the trailing edge, one port adjacent to the trailing edge, the other spaced forward therefrom, means for supplying fluid to the ports and causing the fluid to issue from the ports in the form of fluid curtains, which with the surface of the foil bound a space in contact with the said surface, said ports being so constructed and arranged that the fluid curtains are discharged therefrom at substantial angles to said surface, a cushion of pressurised fluid being formed and contained in said space, said cushion producing forces on the foil upon movement thereof through a fluid.

A particular form of the invention is an aircraft control member such as ailerons and elevators which are normally pivotally attached to the rear part of an aerofoil. The invention can be used to provide the effect of an aileron or an elevator by forming a cushion of pressurised gas in contact with one of the surfaces of the aerofoil. In an aircraft, for example, ports may be provided in the under surface only of each wing, cushions of pressurised gas being formed and contained beneath one or the other of the wings according to the action required. For a rudder, ports are formed in both surfaces, a cushion being formed and contained on one surface or the other depending upon which way it is desired to turn the aircraft.

Another form of the invention is a hydrofoil. The angle of incidence can be varied quite readily by forming and containing a cushion of pressurised fluid in contact with a surface of a hydrofoil.

Yet a further form of a foil to which the invention can be applied is one such as a "flying wing," in which the foil is the main load-carrying member. In such arrangements it may be more convenient to vary the effective angle of incidence by means of cushions of fluid rather than altering the actual attitude of the foil itself.

The effective angle of incidence of the foil can be varied between predetermined values by varying the mass-flow and/or the angle of ejection of the fluid forming the curtains.

The provision of fluid curtains can also be used as a spoiling device in that, as the cushion alters the aerodynamic or hydrodynamic shape of the foil, this will affect the dynamic forces produced on the foil.

Figure 2:
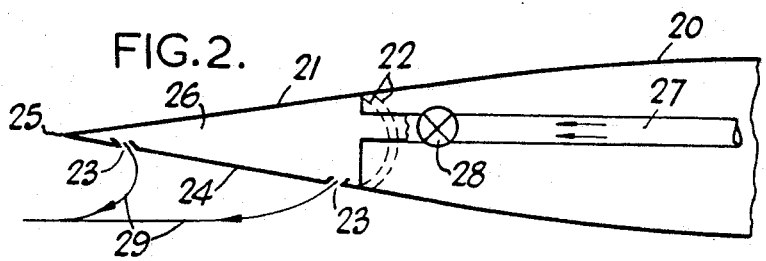
Figure 3:
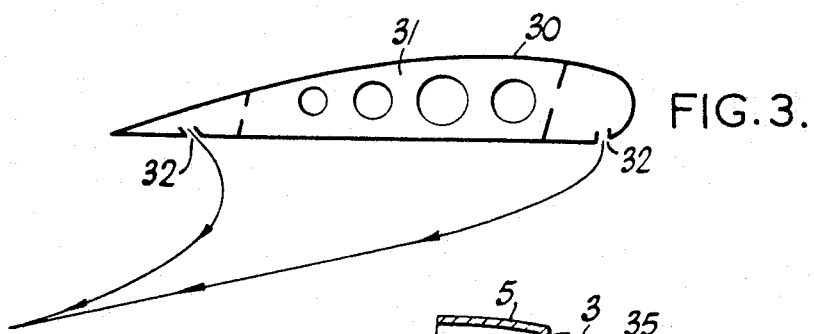
Figure 4:
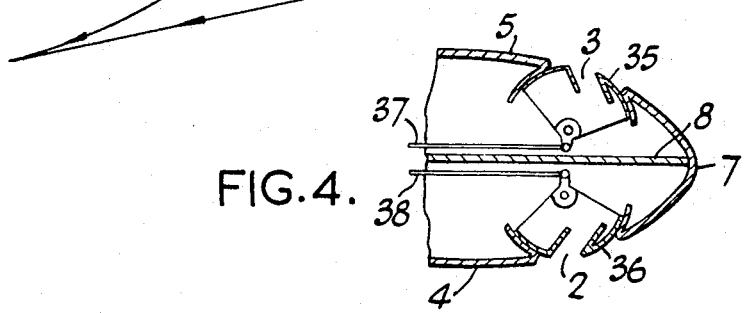

The invention will be readily understood by the following description of certain embodiments, by way of example, in conjunction with the accompanying drawings in which:

FIGURE 1 is a diagrammatic cross-section through a foil illustrating an embodiment of the invention, FIGURE 2 is a diagrammatic fragmentary cross-section of an aircraft wing illustrating the application of the invention for forming a control member therefor, FIGURE 3 is a diagrammatic chordwise vertical cross-section through a helicopter rotor blade embodying the invention, FIGURE 4 illustrates a modification of the foil illustrated in FIGURE 1, to an enlarged scale, FIGURE 5 is a horizontal cross-section through a rudder embodying the invention, on the line A—A of the FIGURE 6, FIGURE 6 is a side view of the rudder shown in FIGURE 5, FIGURE 7 is a side view of an aircraft, the rudder of which is as illustrated in FIGURES 5 and 6, and FIGURE 8 is a side view of a hydrofoil boat, the hydrofoils of which embody the invention.

Numeral 1 illustrates a foil, such as an aerofoil or a hydrofoil. Supply ports 2 and 3 are formed in the surfaces 4 and 5 of the foil, one port in each surface being adjacent to the trailing edge 6, the other port being positioned forward, in the present example adjacent to the leading edge 7. The interior of the foil is divided by a diaphragm 8 into two compartments, 9 and 10. When a fluid is fed to one compartment, for example 9, the fluid issues to form curtains 15. The fluid is ejected in a downwards and rearwards direction from the front port and downwards and forwards from the rear port. The supply ports 2 extend round the outer end of the foil and across the inner end if necessary.

The movement of the foil causes deflection of the front curtain more rearwardly and the two curtains co-operate to enclose a space 16 in contact with the surface 4. Fluid forming the rear curtain initially flows into the space 16 until a cushion of pressurised fluid is built up therein the rear curtain then being deflected until the condition as shown in FIGURE 1 is produced. The formation of the cushion in the space 16 has the effect of altering the apparent angle of incidence of the foil.

A cushion of pressurised fluid can be formed in contact with the surface 5 by supplying air to the compartment 10. The air then issues through ports 3. If it is only desired to form a cushion of pressurised fluid in contact with one surface of the foil, for example the lower surface 4, then the supply ports 3 can be omitted, as can also be the diaphragm 8.

Further supply ports 17 can be provided at positions intermediate the supply ports 2 and 3. A further curtain of fluid 18 will then be formed in the arrangement illustrated in FIGURE 1.

The position of the centre of pressure of the cushion relative to the surface of the foil can be varied by varying the position of at least one or part of one of the ports. For example, an additional port 2a can be provided adjacent to but spaced from that part of the port 2 extending along the leading edge. A sliding vane 19 can be provided to shut off one or the other of ports 2 or 2a, thus varying the position at which the front curtain 15 issues.

FIGURE 2 illustrates the application of the invention to form a control member, for example for an aircraft wing. Only the rear part of a wing 20 is shown. For a normal wing the rearmost part 21 would be separated from the main part of the wing, as indicated diagrammatically by the dotted lines 22 and would be pivotally attached thereto. In the embodiment of the invention illustrated in FIGURE 2, the rearmost part 21 is provided, with supply ports 23 in its lower surface 24, one extending parallel and spaced a small distance forward of the trailing edge 25, the other extending generally parallel to the first port and spaced forward of the first port. The rearmost part 21 of the wing forms a closed shape 26 to which air is fed via a duct 27. The pressure or mass-flow of the air fed to the closed shape 26 is controlled by a valve 28.

The air issues from the ports 23 to form curtains 29 which form and contain a cushion of pressurised air in contact with the surface 24, as described above with reference to FIGURE 1. By varying the pressure or mass-flow of the air supplied through the duct 27, the strength of the curtains can be varied. This in turn varies the thickness of the cushion, in a direction normal to the surface 24, and thus varies the effective change in angle of incidence or inclination of the rearmost part 21 of the wing. The curtains can also be completely shut off.

The invention is also applicable to the rotating wings or blades of helicopters. A cross-section of a typical rotor blade would be substantially as shown in FIGURE 3. The blade 30 is hollow, air being fed to the blade from an engine mounted in the body of the helicopter. Ribs 31 are provided to stiffen the blade, holes being pierced in the ribs for lightness and to allow free flow of air. The air issues from a supply port 32 formed right round the periphery of the blade, in the bottom surface. By suitable cyclic variation of the air flow it is possible to obviate at least some of the cyclic pitch variation of the blades normally required as they rotate. The helicopter can either be initially supported clear of the surface by a cushion of air formed beneath the main body, or, which is most likely, the helicopter will rest on the surface until the rotor is rotating fast enough to produce sufficient lift.

It will be seen in FIGURE 3 that that part of the supply port 32 adjacent to the leading edge is arranged to eject the air normal to the chordal axis of the blade. If desired the whole of the supply port 32 can be arranged to eject the air in this manner. Similarly, ejection normal to the chordal axis of the foil can be provided in the embodiments illustrated in FIGURES 1 and 2.

Instead of, or in addition to, varying the mass-flow of a curtain, its angle of ejection, or efflux angle, can be varied. FIGURE 4 illustrates a modification to the ports 2 and 3 of the foil illustrated in FIGURE 1. The ports 2 and 3 are formed by pivoted members 35 and 36. The pivotal members can be moved by control rods 37 and 38 by the person controlling the vehicle so as to vary the efflux angle.

Although the arrangement in FIGURE 4 is illustrated for the forward part of FIGURE 1, it will be appreciated that such a modification can be provided for any part of a port, or for the whole port as desired, for example for any of the ports in FIGURES 1 to 3 or in FIGURES 5 to 8.

FIGURES 5, 6 and 7 illsutrate the invention applied to a control surface of an aircraft, in this particular case a rudder. The rudder 45 is hollow and divided vertically into two sections 46 and 47 by a diaphragm 48 which extends from the leading edge to the trailing edge. An endless supply port 49 is formed on each side of the rudder adjacent to the periphery thereof. Air is fed from an auxiliary engine 50 positioned in the rear part of the fuselage of the aircraft via a duct 51 which subdivides into two ducts 52 and 53, which supply air to the two sections 46 and 47. Hinged flaps 54 and 55 regulate the flow of air into the ducts 52 and 53. In operation, when rudder action is required, one or other of the flaps 54 and 55 is opened, by linkage 56 or 57, air passing to the relevant section of the rudder and issuing from the supply port. For example, operation of flap 54 admits air to the starboard section 46. A wedge shaped cushion is formed which causes the rudder to receive a thrust to port, the aircraft thus turning to starboard. Variation of the mass flow of the air curtain formed by the air issuing from the supply port by varying the degree of opening of the flaps 54 and 55 will vary the "rudder effect" obtained.

The invention is also applicable to the hydrofoils of hydrofoil boats and ships. FIGURE 8 illustrates such a ship 60, which, at high speeds, is supported with the main hull clear of the water by hydrofoils 61 at front and rear. The hydrofoils 61 are of the form as illustrated in FIGURE 1. Supply ports may be formed in both surfaces or in the lower surface only, as described with reference to FIGURE 1.

The angle of incidence of the hydrofoils may be varied by feeding a fluid to the supply ports. In the example shown, air is fed from a compressor or pump 62 which may be driven by the propulsion engine 63. Alternatively water can be used, for example picked up by a scoop 70. The fluid is fed via ducts 64 down through the struts 65 and into the interior of the hydrofoils. The flow of fluid is controlled by valves 66. The valves 66 vary the flow of fluid as desired to control the effective angle of incidence of the hydrofoils 61 so as to reduce the variation of lift experienced by the foil as a result of variations in the dynamic conditions when on a craft travelling over a wave system. The flow of fluid can be completely shut off if desired.

I claim:
1. An aircraft control member having two oppositely disposed surfaces and a substantially continuous port formed in each surface, each of said ports including two portions extending normal to the direction of motion of the control member through the air, means for selectively supplying gas to the ports in said surfaces and causing said gas to issue from the ports in the form of gaseous curtains which, with the said surfaces, bound at least one space in contact with each of said surfaces, said ports being so constructed and arranged that said gaseous curtains are discharged therefrom at substantial angles to said surfaces and inwardly with respect to said spaces, and means for forming and maintaining a cushion of pressurised gas in each of said spaces during operation of the aircraft, said cushions producing aerodynamic forces on the member upon movement thereof through the air.
2. An aircraft control member as claimed in claim 1 in which the gaseous curtains from and maintain the cushions of pressurised gas.

3. An aircraft control member as claimed in claim 1 including means for varying the mass-flow of the fluid issuing from at least one portion of each of said ports.

References Cited by the Examiner
UNITED STATES PATENTS

| | | | |
|---|---|---|---|
| 1,854,043 | 4/1932 | Korner | 244—42 |
| 2,049,573 | 8/1936 | Stalker | 244—42 |
| 2,896,881 | 7/1959 | Attenello | 244—41 |
| 3,128,063 | 4/1964 | Kaplan | 244—42 |

FOREIGN PATENTS

| | | |
|---|---|---|
| 219,133 | 1/1959 | Australia. |
| 584,585 | 9/1933 | Germany. |
| 893,103 | 1/1944 | France. |

MILTON BUCHLER, *Primary Examiner.*

B. BELKIN, *Assistant Examiner.*